United States Patent
Fokoua et al.

(10) Patent No.: US 9,904,008 B2
(45) Date of Patent: Feb. 27, 2018

(54) HOLLOW-CORE PHOTONIC BANDGAP FIBERS AND METHODS OF MANUFACTURING THE SAME

(71) Applicant: University of Southampton, Southampton, Hampshire (GB)

(72) Inventors: Eric Rodrigue Numkam Fokoua, Southampton (GB); Francesco Poletti, Southampton (GB); David John Richardson, Southampton (GB)

(73) Assignee: University of Southampton, Hampshire (GB)

( * ) Notice: Subject to any disclaimer, the term of this patent is extended or adjusted under 35 U.S.C. 154(b) by 0 days.

(21) Appl. No.: 15/023,514

(22) PCT Filed: Sep. 19, 2014

(86) PCT No.: PCT/EP2014/070045
§ 371 (c)(1),
(2) Date: Mar. 21, 2016

(87) PCT Pub. No.: WO2015/040187
PCT Pub. Date: Mar. 26, 2015

(65) Prior Publication Data
US 2016/0209586 A1    Jul. 21, 2016

(30) Foreign Application Priority Data
Sep. 20, 2013 (GB) .................................. 1316793.7

(51) Int. Cl.
*G02B 6/02* (2006.01)
(52) U.S. Cl.
CPC ..... *G02B 6/02357* (2013.01); *G02B 6/02328* (2013.01); *G02B 6/02347* (2013.01)

(58) Field of Classification Search
CPC ............ G02B 6/02357; G02B 6/02347; G02B 6/02328
See application file for complete search history.

(56) References Cited

U.S. PATENT DOCUMENTS

| 5,907,652 A | 5/1999 | DiGiovanni et al. |
| 6,888,992 B2 | 5/2005 | Russell et al. |

(Continued)

FOREIGN PATENT DOCUMENTS

| JP | 2002/029769 A | 1/2002 |
| WO | WO 2004/057391 A1 | 7/2004 |

(Continued)

OTHER PUBLICATIONS

Francesco Poletti, "Hollow core fiber with an octave spanning bandgap", Sep. 1, 2010, Optics Letters, vol. 35, No. 17, pp. 2837-2839.*

(Continued)

*Primary Examiner* — John M Bedtelyon
(74) *Attorney, Agent, or Firm* — Renner, Otto, Boisselle & Sklar, LLP

(57) ABSTRACT

A hollow-core photonic bandgap fiber having a hollow core and a cladding which surrounds the core at a core boundary and comprises a lattice or network of struts and interstitial nodes which together define an array of cavities, wherein a ratio between a difference in a length of a longest and shortest pitch spacing of the nodes at the core boundary to an average pitch spacing at the core boundary is less than about 0.3.

20 Claims, 16 Drawing Sheets

(56) References Cited

U.S. PATENT DOCUMENTS

| | | |
|---|---|---|
| 2003/0230118 A1 | 12/2003 | Dawes et al. |
| 2005/0226578 A1 | 10/2005 | Mangan et al. |
| 2010/0247046 A1 | 9/2010 | Dong et al. |
| 2011/0085769 A1 | 4/2011 | Dong et al. |

FOREIGN PATENT DOCUMENTS

| | | |
|---|---|---|
| WO | WO 2004/057393 A1 | 7/2004 |
| WO | 2005/012197 A2 | 2/2005 |

OTHER PUBLICATIONS

International Search Report and Written Opinion for corresponding Patent Application No. PCT/EP2014/070045 dated Mar. 26, 2015.
International Preliminary Report on Patentability for corresponding Patent Application No. PCT/EP2014/070045 dated Mar. 22, 2016.
Kiarash Zamani Aghaie et al.; "Experimental Assessment of the Accuracy of an Advanced Photonic-Bandgap-Fiber Model", Journal of Lightwave Technology, vol. 31, No. 7, Apr. 1, 2013, pp. 1015-1022.
R. Amezcua-Correa et al.; "Optimizing the usable bandwidth and loss through core design in realistic hollow-core photonic bandgap fibers", Optics Express, vol. 14, No. 17, Aug. 21, 2006, pp. 7974-7985.
R. Amezcua-Correa et al.; "Design of 7 and 19 cells core air-guiding photonic crystal fibers for low-loss, wide bandwidth and dispersion controlled operation", Optics Express, vol. 15, No. 26, Dec. 24, 2007, pp. 17577-17586.
R. Amezcua-Correa et al.; "Control of surface modes in low loss hollow-core photonic bandgap fibers", Optics Express, vol. 16, No. 2, Jan. 21, 2008, pp. 1142-1149.
R. Amezcua-Correa et al.; "Control of Surface Modes in Low Loss Hollow-Core Photonic Bandgap Fibers", IEEE Conference on Lasers and Electro-Optics, 1-2 (2008).
M.H. Frosz et al.; "Five-ring hollow-core photonic crystal fiber with 1.8 dB/km loss", Optics Letters, vol. 28, No. 13, Jul. 1, 2013, pp. 2215-2217.
Y. Jung et al.; "First Demonstration of a Broadband 37-cell Hollow Core Photonic Bandgap Fiber and Its Application to High Capacity Mode Division Multiplexing", Proceedings of the Optical Fiber Communications conference (2013), paper PDP5A.3.
Ming-Jun Li et al.; "Modeling Effects of Structural Distortions on Air-Core Photonic Bandgap Fibers", Journal of Lightwave Technology, vol. 25, No. 9, Sep. 2007, pp. 2463-2468.
B.J. Mangan et al.; "Low loss (1.7 dB/km) hollow core photonic bandgap fiber", Proceedings of Optical Fiber Communication Conference (2004), paper PDP24.
Tadashi Murao et al.; "Structural Optimization of Air-Guiding Photonic Bandgap Fibers for Realizing Ultimate Low Loss Waveguides", Journal of Lightwave Technology, vol. 26, No. 12, Jun. 15, 2008.
Eric Numkam Fokoua et al.; "Analysis of light scattering from surface roughness in hollow-core photonic bandgap fibers", Optics Express, vol. 20, No. 19, Sep. 10, 2012, pp. 20980-20991.
F. Poletti et al.; "Advances and limitations in the modeling of fabricated photonic bandgap fibers", Optical Fiber Communication Conference and Exposition and the National Fiber Optic Engineers Conference, Technical Digest (CD) (Optical Society of America, 1006), paper OFC2.
Francesco Poletti; "Hollow core fiber with an octave spanning bandgap", Optics Letters, vol. 35, No. 17, Sep. 1, 2010, pp. 2837-2839.
Francesco Poletti et al.; "Understanding the Physical Origin of Surface Modes and Practical Rules for their Suppression", accepted for oral presentation at ECOC 2013.
F. Poletti et al.; "Towards high-capacity fibre-optic communications at the speed of light in vacuum", Nature Photonics Letters online, Mar. 24, 2013, pp. 279-284.
P.J. Roberts et al.; "Ultimate low loss of hollow-core photonic crystal fibres", Optics Express, vol. 13, No. 1, Jan. 10, 2005, pp. 236-244.
P.J. Roberts et al.; "Realizing low loss air core photonic crystal fibers by exploiting an antiresonant core surround", Optics Express, vol. 13, No. 20, Oct. 3, 2005, pp. 8277-8285.
Kunimasa Saitoh et al.; "Leakage loss and group velocity dispersion in air-core photonic bandgap fibers", Optics Express, vol. 11, No. 23, Nov. 17, 2003, pp. 3100-3109.
Charlene M. Smith et al.; "Low-loss hollow-core silica/air photonic bandgap fibre", Nature, vol. 424, Aug. 7, 2003, pp. 657-659.
Rosalind M. Wynne; "A Fabrication Process for Microstructured Optical Fibers", Journal of Lightwave Technology, vol. 24, No. 11, Nov. 2006, pp. 4304-4313.

* cited by examiner

— Prior Art —

(a)

(b)

(c)

(d)

(e)

(a)

(b)

(c)

(d)

(e)

HOLLOW-CORE PHOTONIC BANDGAP FIBERS AND METHODS OF MANUFACTURING THE SAME

This application is a national phase of International Application No. PCT/EP2014/070045 filed Sep. 19, 2014 and published in the English language, which claims priority to United Kingdom Patent Application No. 1316793.7 filed Sep. 20, 2013, which are hereby incorporated herein by reference in their entirety.

The present invention relates to hollow-core photonic bandgap fibers (HC-PBGFs), for example, for application in data transmission and high-power laser pulse delivery, and methods of manufacturing the same.

As illustrated in FIG. 1, HC-PBGFs comprise an elongate fiber body having a hollow core 3 and a cladding 5 which surrounds the core 3 at a boundary 7 and comprises a silica lattice of relatively-thin struts 9 and relatively-large interstitial nodes 11, which together define an array of air holes of cavities 15 which are arranged in packed relation around the core 3, with the core 3 being formed by omitting a number of capillaries at the center of the structure. FIG. 1 illustrates a prior art HC-PBGF design which is considered to be most optimized or ideal, in preserving a perfect cladding periodicity of nodes 11' at the boundary 7 of the core 3 and the cladding 5.

It is the optical resonance properties of these nodes that primarily determine the photonic bandgap or range of optical frequencies over which light can be effectively confined and guided within the core.

It is desirable in many applications to achieve a wide photonic bandgap over which light can be guided with low loss. The termination of the microstructured cladding around the core forms a continuous boundary which consists of nodes interconnected by struts. As loss is predominantly dictated by the overlap of the guided-mode field with this boundary through scattering at the air-glass interfaces, optimizing its configuration is important in loss reduction.

Owing to recent progress in the development of HC-PBGFs, these fibers are now emerging as a credible alternative to the all-solid optical fibers as used in telecom applications [1, 2]. Indeed, the highly-desirable features of low-latency, ultralow nonlinearity and potentially lower transmission loss make these fibers suitable for next generation data-carrying fibers. However, the attenuation levels which are fundamentally limited by scattering from surface roughness have yet to be reduced to theoretically predicted levels [3-4].

Numerous efforts in loss reduction have aimed at optimizing the fiber design to reduce the overlap of the guided-mode field with the scattering surfaces.

Notably, the introduction of an anti-resonant core surround has led to the lowest reported loss value of 1.7 dB/km [5]. However, the resulting "thick" core supports a multitude of surface modes within the photonic bandgap, which restrict the usable bandwidth.

It has also been demonstrated that for fibers with a seven cell (7c) core defect, making the core wall half as thin as the struts in the cladding eliminates surface modes, thereby increasing the operational bandwidth [8-10].

In an attempt to expand the usable bandwidth and further reduce loss in fibers with larger core defects, a number of recently-reported HC-PBGFs have been produced without a core tube. This fabrication procedure has, however, resulted in more prominent structural distortions, notably, more enlarged core defects, including oversized air holes on the six "corners" around the core and compressed claddings with different periodicity along the main symmetry axes [1, 2, 11].

Significant theoretical efforts have already been devoted to understanding and predicting the attenuation that could be obtained from a given HC-PBGF design. This work has, however, either neglected the scattering loss contribution, and hence considerably underestimated the total loss, or considered only "ideal" structures with perfectly periodic lattices, which are visibly different from fabricated lattices [12].

Another strand of activity has focused on modeling fiber geometries obtained from scanning electron micrographs of fabricated fibers; however, instrument resolution imposes a constraint on the accuracy of such studies [13, 14]. For a full fiber cross-section, the width of a single glass strut is only a few pixels wide, making it difficult for edge-detection routines to determine accurately the boundaries of the cladding air holes, and even more so to estimate thickness and impact of the metallic coating necessary to acquire the images. Good quantitative agreement between measured and simulated modal properties, such as dispersion and mode-field diameter of current commercial HC-PBGFs, has been obtained using this approach, although any reasonable comparison of loss values is foregone by the omission of part of the cladding [15].

Contrary to the common understanding in the art, the present inventors have recognized that an exact periodicity in the cladding is not a strict requirement for air-guidance. From this recognition, the present inventors have devised improved fiber designs which are less susceptible to surface-mode induced bandwidth degradation, exhibit a considerable reduction in loss and advantageously allow the core wall thickness to be increased.

In one aspect the present invention provides a hollow-core photonic bandgap fiber having a hollow core and a cladding which surrounds the core at a core boundary and comprises a lattice or network of struts and interstitial nodes which together define an array of cavities, wherein a ratio between a difference in a length of a longest and shortest pitch spacing of the nodes at the core boundary to an average pitch spacing at the core boundary is less than about 0.3.

In another aspect the present invention provides a hollow-core photonic bandgap fiber having a hollow core and a cladding which surrounds the core at a core boundary and comprises a lattice or network of struts and interstitial nodes which together define an array of cavities, wherein a ratio of the average cross-sectional area of the nodes at the core boundary to the average cross-sectional area of the nodes within a body of the cladding is from about 0.8 to about 1.2.

In a further aspect the present invention provides a hollow-core photonic bandgap fiber having a hollow core and a cladding which surrounds the core at a core boundary and comprises a lattice or network of struts and interstitial nodes which together define an array of cavities, wherein a ratio of the average cross-sectional area of the nodes at the core boundary to the average cross-sectional area of the nodes within a body of the cladding is from about 1.4 to about 2.0.

In a still further aspect the present invention provides a hollow-core photonic bandgap fiber having a hollow core and a cladding which surrounds the core at a core boundary and comprises a lattice or network of struts and interstitial nodes which together define an array of cavities, wherein a ratio of a thickness of the struts at the core boundary to a thickness of the struts within a body of the cladding is from about 0.4 to about 1.0.

In a yet further aspect the present invention provides a hollow-core photonic bandgap fiber having a hollow core and a cladding which surrounds the core at a core boundary and comprises a lattice or network of struts and interstitial nodes which together define an array of cavities, wherein the effective diameter of the core is greater than about 1.05 nΛ, where n is the number of cells removed to form the core along the diagonal and Λ is the average spacing of the cavities.

In yet another aspect the present invention provides a hollow-core photonic bandgap fiber having a hollow core and a cladding which surrounds the core at a core boundary and comprises a lattice or network of struts and interstitial nodes which together define an array of cavities, wherein a ratio of a thickness of the struts to an average spacing of the nodes is less than about 0.05.

In still another aspect the present invention provides a hollow-core photonic bandgap fiber having a hollow core and a cladding which surrounds the core at a core boundary and comprises a lattice or network of struts and interstitial nodes which together define an array of cavities, wherein a ratio of a cross-sectional area of the struts to a cross-sectional area of the nodes is from about 1 to about 30.

In still another aspect the present invention provides a hollow-core photonic bandgap fiber having a hollow core and a cladding which surrounds the core at a core boundary and comprises a lattice or network of struts and interstitial nodes which together define an array of cavities, wherein a ratio of the effective diameter of the core to the effective diameter of the cladding is at least about 0.33 when five rings of cavities surround the core.

In still another aspect the present invention provides a hollow-core photonic bandgap fiber having a hollow core and a cladding which surrounds the core at a core boundary and comprises a lattice or network of struts and interstitial nodes which together define an array of cavities, wherein a ratio of the effective diameter of the core to the effective diameter of the cladding is at least about 0.3 when six rings of cavities surround the core.

In a yet still further aspect the present invention provides a hollow-core photonic bandgap fiber having a hollow core and a cladding which surrounds the core at a core boundary and comprises a lattice or network of struts and interstitial nodes which together define an array of cavities, wherein a ratio of the effective diameter of the core to the effective diameter of the cladding is at least about 0.27 when seven rings of cavities surround the core.

By providing that the nodes at the core boundary are substantially equi-spaced, the modal overlap with the scattering surfaces, and hence fiber loss, is minimized.

In addition, providing the core boundary with nearly equidistant nodes is effective in eliminating surface modes, without causing significant bandwidth or loss penalty, even in fibers with a thickened core wall or which incorporate a core tube, which can present advantages in fabrication.

With the present invention, it is predicted that for a fiber with a nineteen cell (19c) core defect, in an optimum configuration, losses can be reduced to less than 0.5 dB/km at a wavelength of 1.55 μm over a 450 nm bandwidth, with it being possible to reduce loss further, for example, by a factor greater than 2 by operating at a wavelength of 2 μm or by more than 2.7 times using a fiber with a thirty-seven cell (37c) or greater core defect.

Furthermore, for laser delivery applications, dispersion engineering is easily achieved through control of the size of the core nodes.

Preferred embodiments of the present invention will now be described hereinbelow by way of example only with reference to the accompanying drawings, in which.

Figure 3:
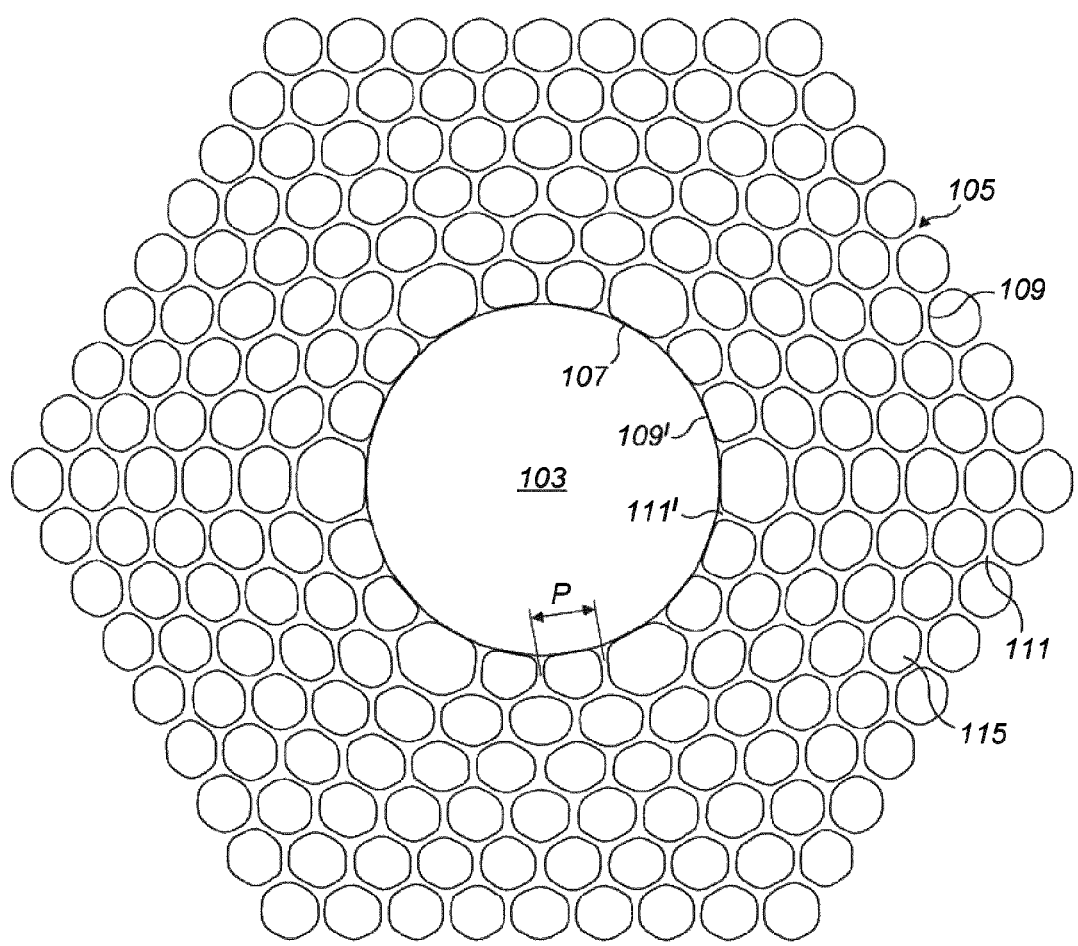
FIG. 3 illustrates a lateral cross-section through a HC-PBGF in accordance with a second embodiment of the present invention.
Figure 10A:
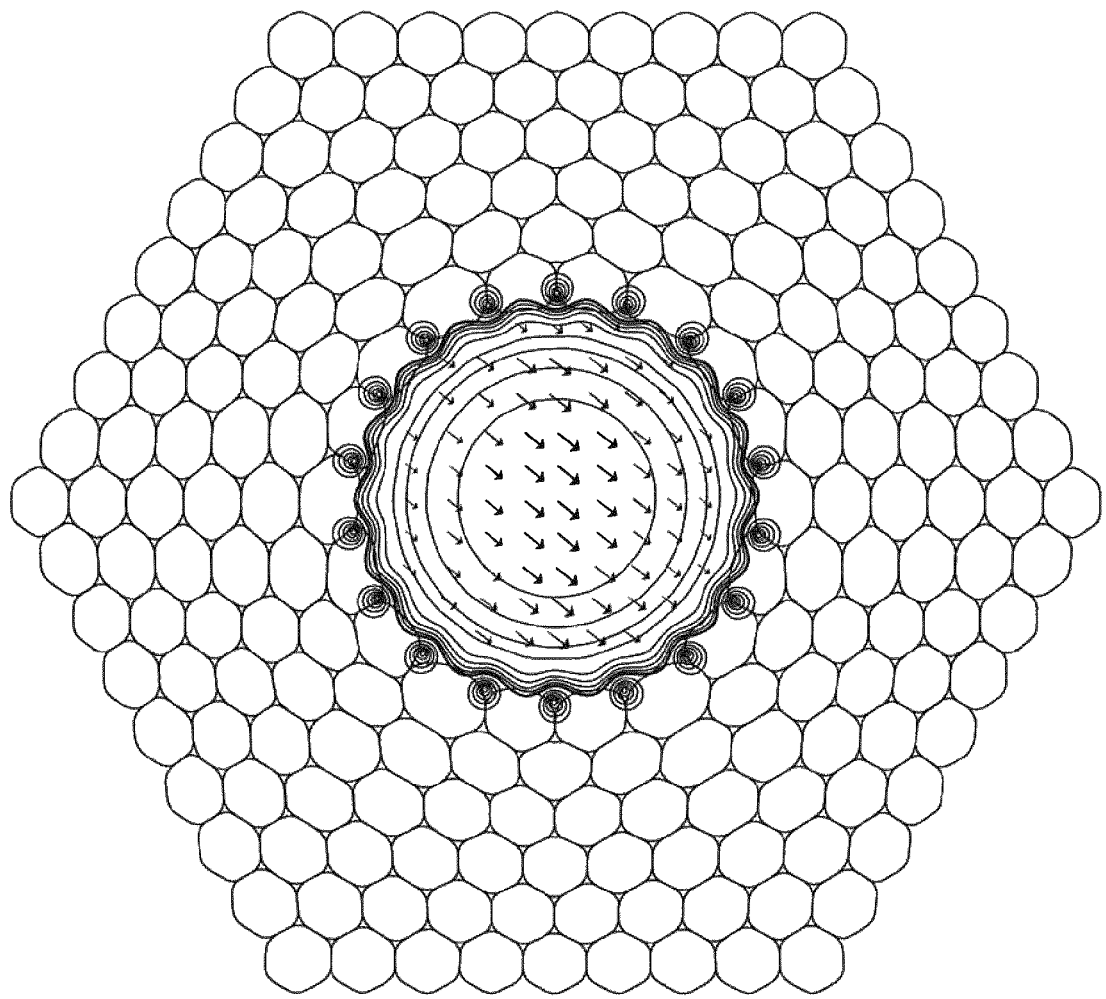
Figure 10B:
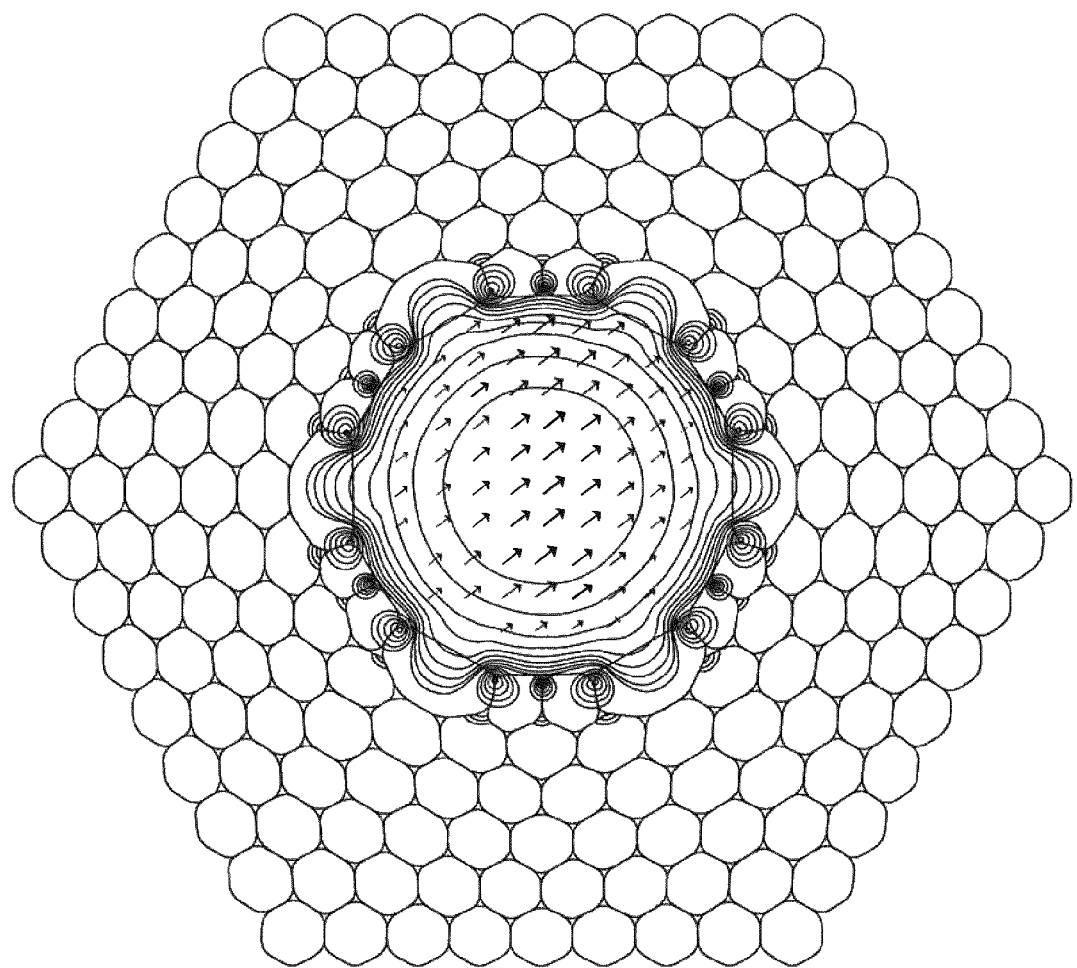
Figure 11:
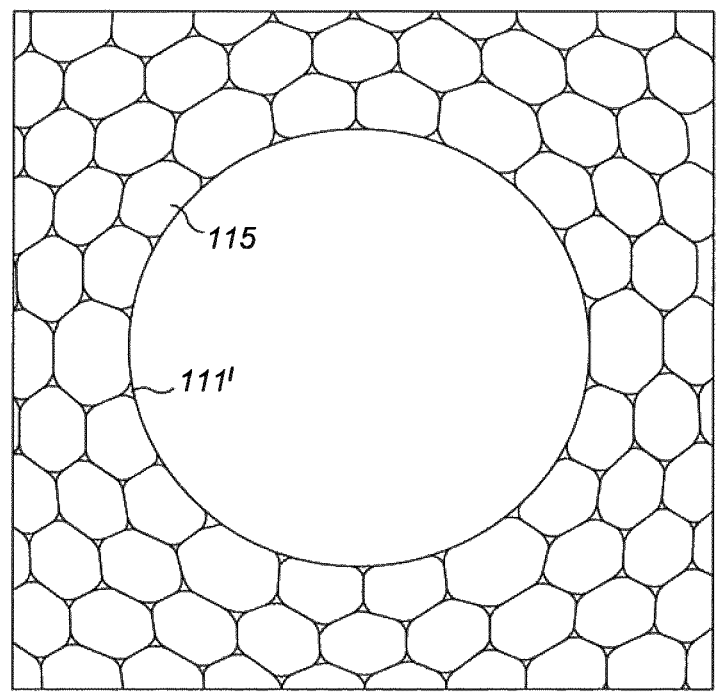
Figure 11:
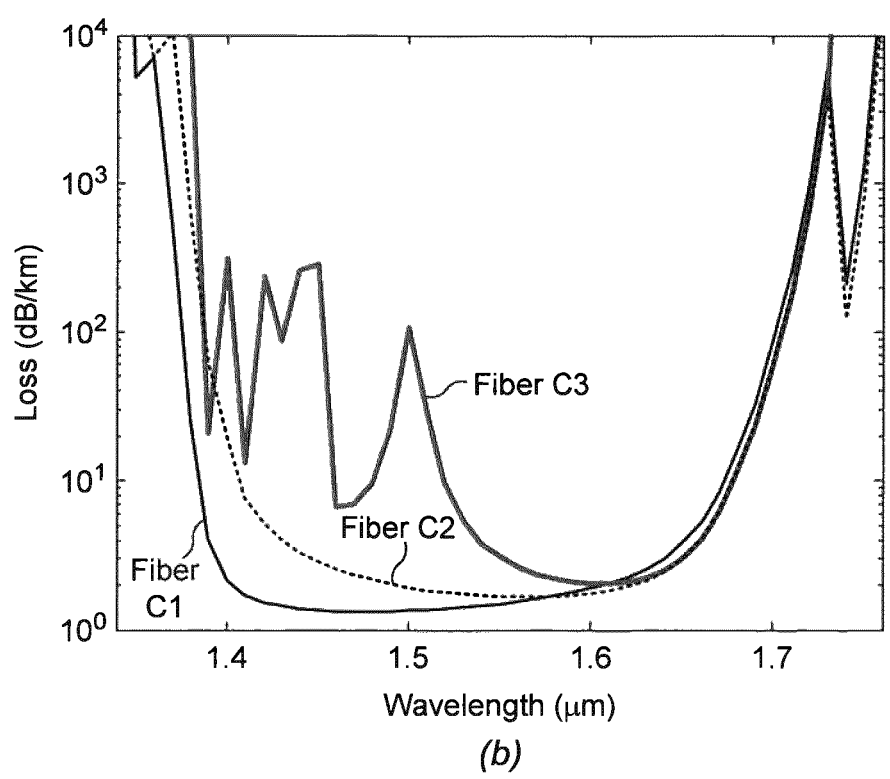
Figure 11:
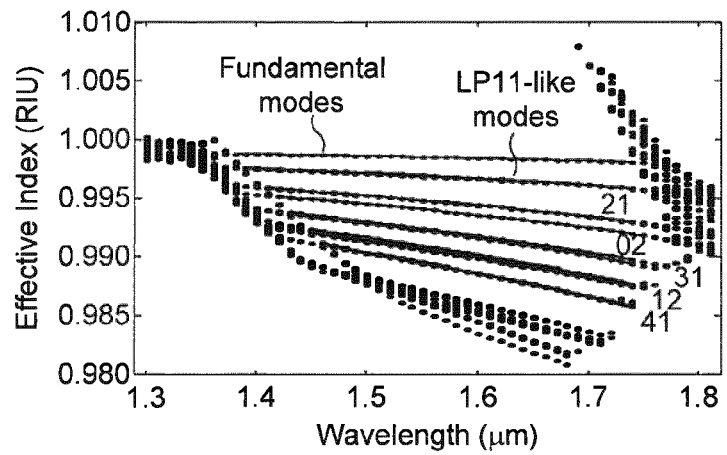
Figure 11:
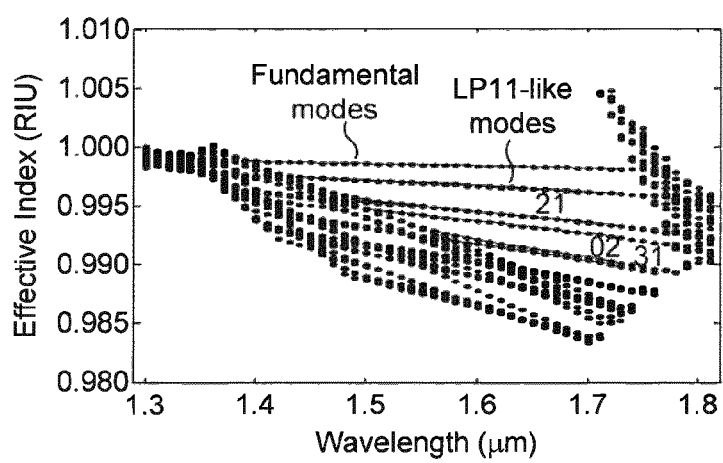
Figure 11:
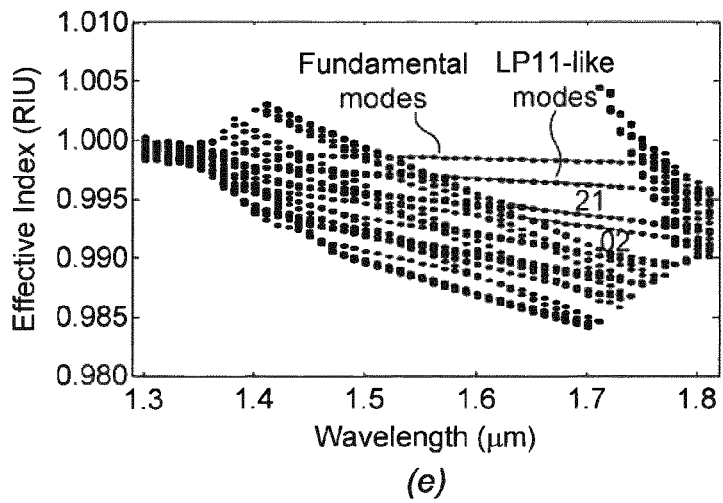
Figure 12:
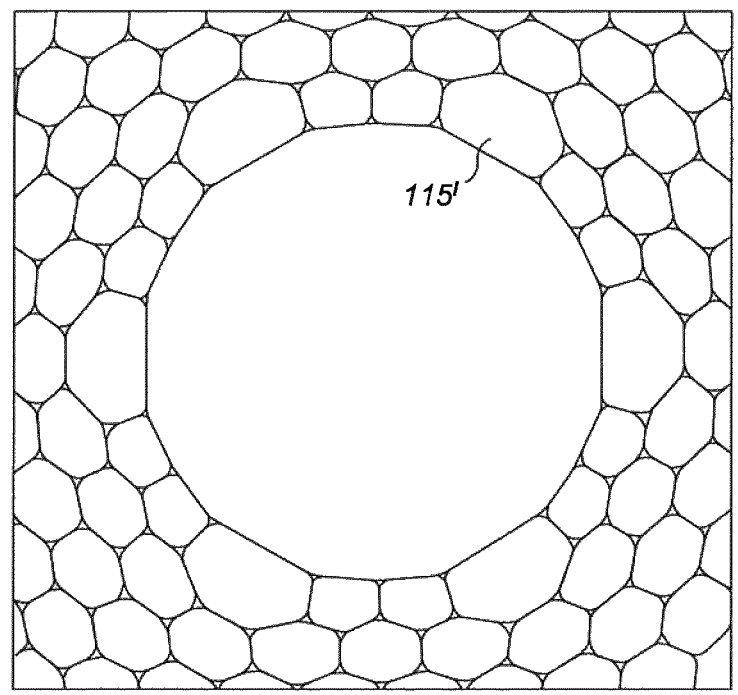
Figure 12:
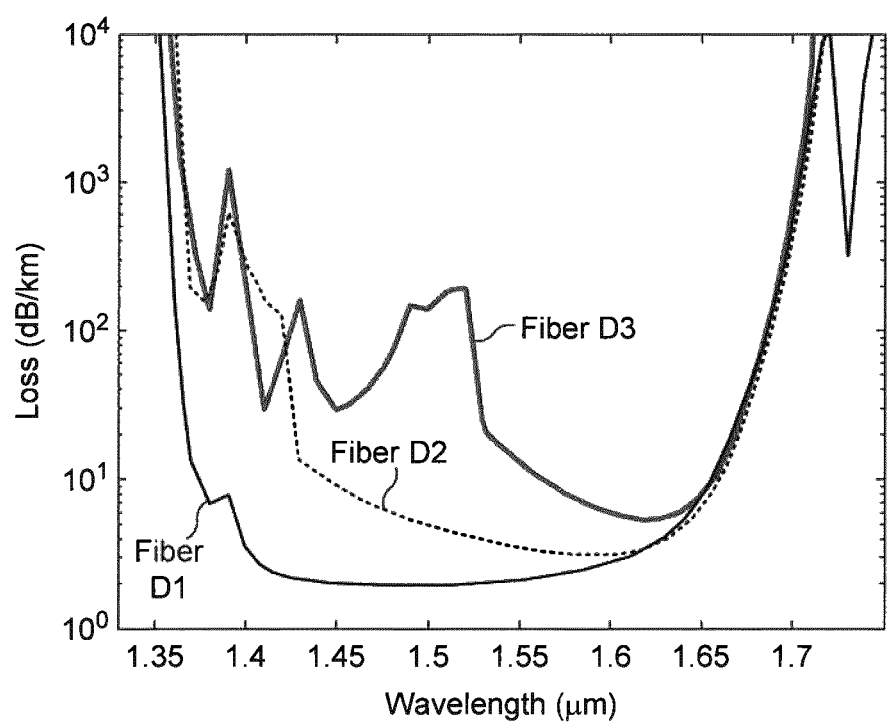
Figure 12:
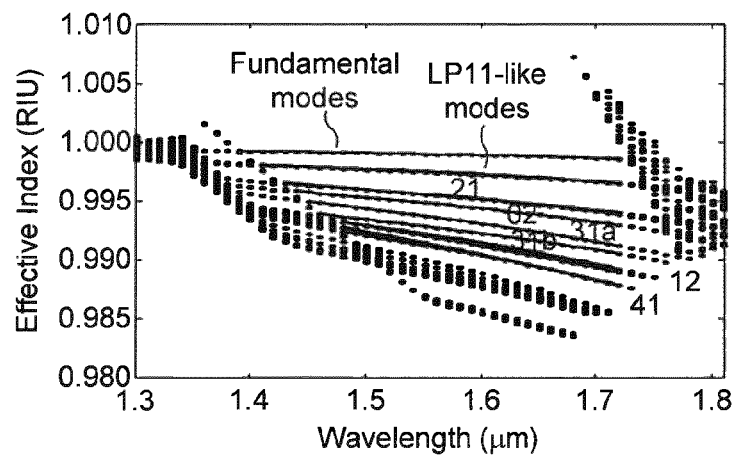
Figure 12:
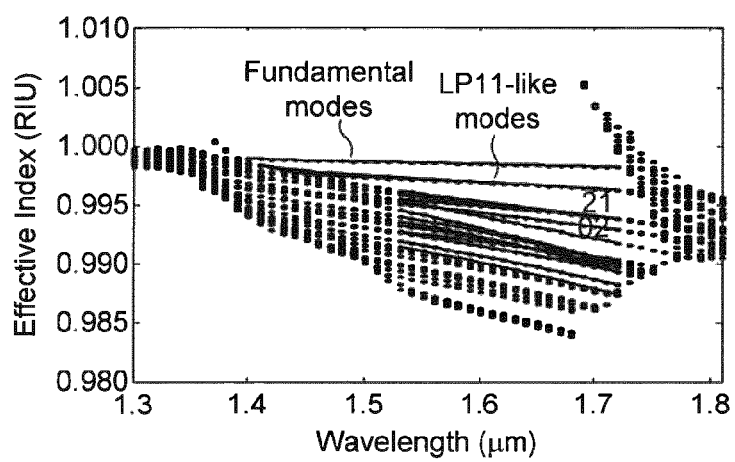
Figure 12:
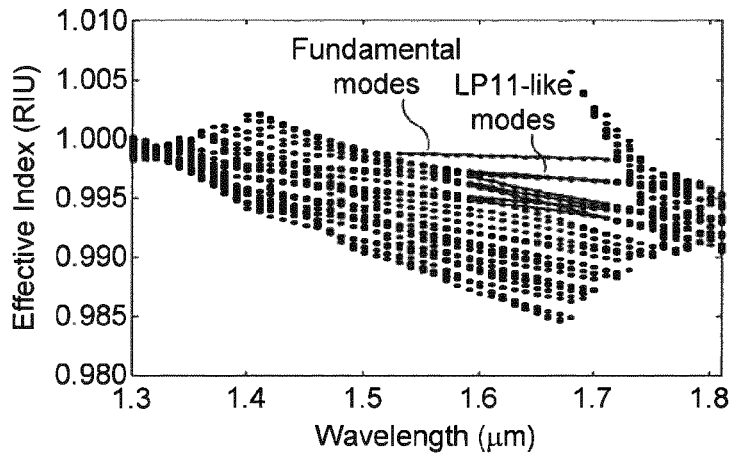
Figure 13:
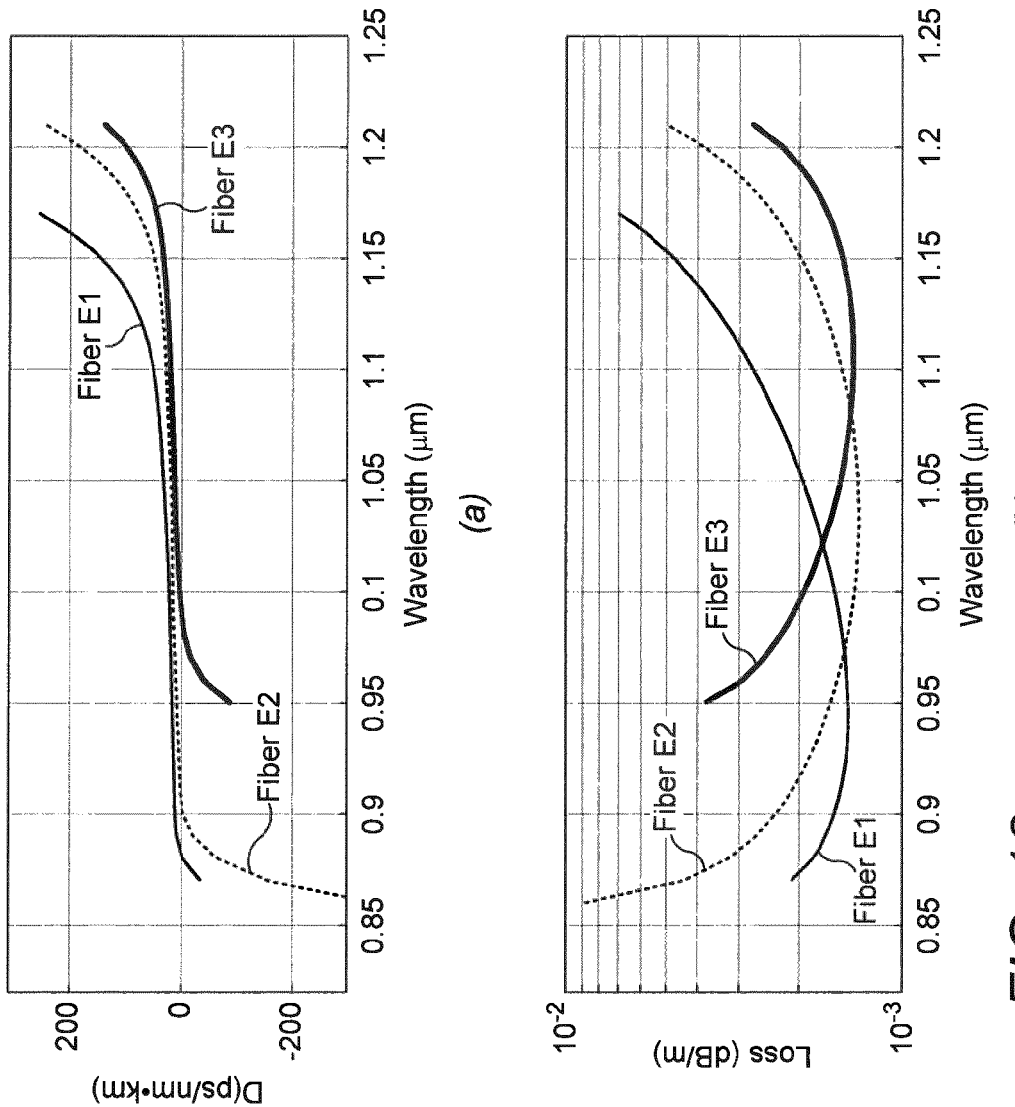
Figure 13:
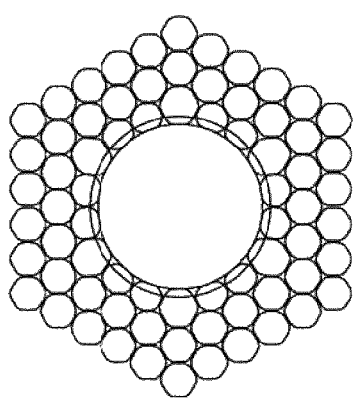

FIGS. 10(a) and (b) illustrate contour plots of the average power flow in the z-direction from Fibers B1 and B6, respectively, of the fiber of FIG. 3;

FIG. 11 illustrates plots of the simulated loss as a function or core wall thickness for fibers in accordance with the embodiment of FIG. 3, where each having equi-spaced core nodes and having no core tube and core tubes of the same thickness as the capillaries in the starting stack and 1.25 times the thickness of the capillaries in the starting stack;

FIG. 12 illustrates plots of loss as a function or core wall thickness for fibers in accordance with the embodiment of FIG. 3, where each having oversized "corner" cavities and having no core tube and core tubes of the same thickness as the capillaries in the starting stack and 1.25 times the thickness of the capillaries in the starting stack;

FIG. 13(a) illustrates plots of the simulated dispersion for fibers in accordance with the embodiment of FIG. 3, having increasing node sizes at the core boundary; and FIG. 13(b) illustrates plots of the simulated loss as a function of node size, corresponding to FIG. 13(a).

In the present embodiments the fiber loss accounts for contributions from both leakage (or confinement) loss and scattering from surface roughness. The latter is known to impose a fundamental limit on the achievable attenuation in HC-PBGFs, and as recently shown, is the major loss contribution in fibers with ~dB/km loss levels with six or more rings of air holes outside the core defect [3, 4]. For computation purposes, but without loss of generality, the scattering loss is computed here not by the rigorous treatment formulated in [4], but through the simplified method of calculating the normalized interface field intensity of the fiber on the air-glass interfaces [3]:

$$F = \left(\frac{\varepsilon_0}{\mu_0}\right)^{\frac{1}{2}} \frac{\oint_{hole-perimeters} |E|^2 ds}{\iint_{cross-section} E \times H^* dA}$$

where E and H are the electric and magnetic field vectors of the fundamental mode. In addition, the scattering loss is calibrated by comparing multiple measurements and simulations so that a loss value of 3.5 dB/km around a wavelength of 1.5 μm corresponds to an interface field intensity (F) of 0.0116 μm$^{-1}$.

Figure 2:
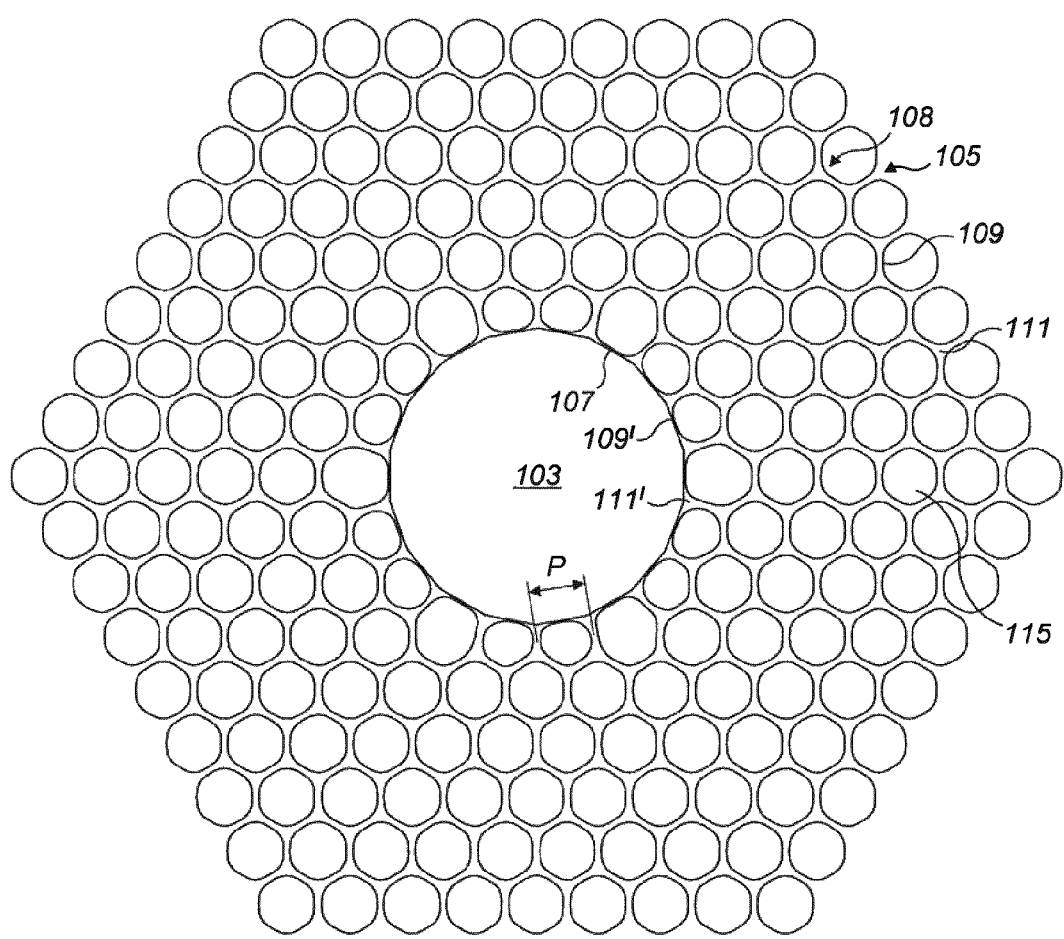
FIG. 2 illustrates a lateral cross-section through a HC-PBGF in accordance with a first embodiment of the present invention.

FIG. 2 illustrates a HC-PBGF in accordance with a first embodiment of the present invention.

The HC-PBGF comprises an elongate fiber body having a hollow core 103 and a cladding 105 which surrounds the core 103 at a boundary 107.

In this embodiment the core 103 is gas filled, here air filled. In other embodiments the core 103 could be filled with any of argon, xeon, helium or hydrogen.

In an alternative embodiment the core 103 could be a vacuum.

In another alternative embodiment the core 103 could contain a liquid.

In this embodiment the core 103 is substantially circular in section.

The cladding 105 comprises a lattice or network 108 of struts 109, 109' and interstitial nodes 111, 111', which together define a plurality of cavities 115, in this embodiment extending along the length of the fiber body, which are arranged in packed relation around the core 103.

In this embodiment the network 108 is formed of glass, such as silicate glasses, fluoride glasses, telluride glasses or chalcogenicide glasses.

In an alternative embodiment the network 108 could be formed of a polymer.

In one embodiment different materials, glasses or polymers, may be used in the cladding 105 for an inner region at the core boundary 107 and for an outer region.

In one embodiment different materials, glasses or polymers, can be used in regions across the cross-section of the cladding 105.

In this embodiment the cavities 115 comprise gas-filled holes, here air-filed holes.

In other embodiments the cavities 115 could be filled with any of argon, xeon, helium or hydrogen.

In an alternative embodiment the cavities 115 could be a vacuum.

In another alternative embodiment the cavities 115 could contain a liquid.

In this embodiment the cavities 115 are arranged in triangular-packed relation.

In alternative embodiments the cavities 115 could be packed in other relation, such as square-packed or hexagonal-packed.

In this embodiment the struts 109' at the core boundary 107 have substantially equal length, and the nodes 111' at the core boundary 107 are substantially equi-spaced at a pitch p.

Figure 1:
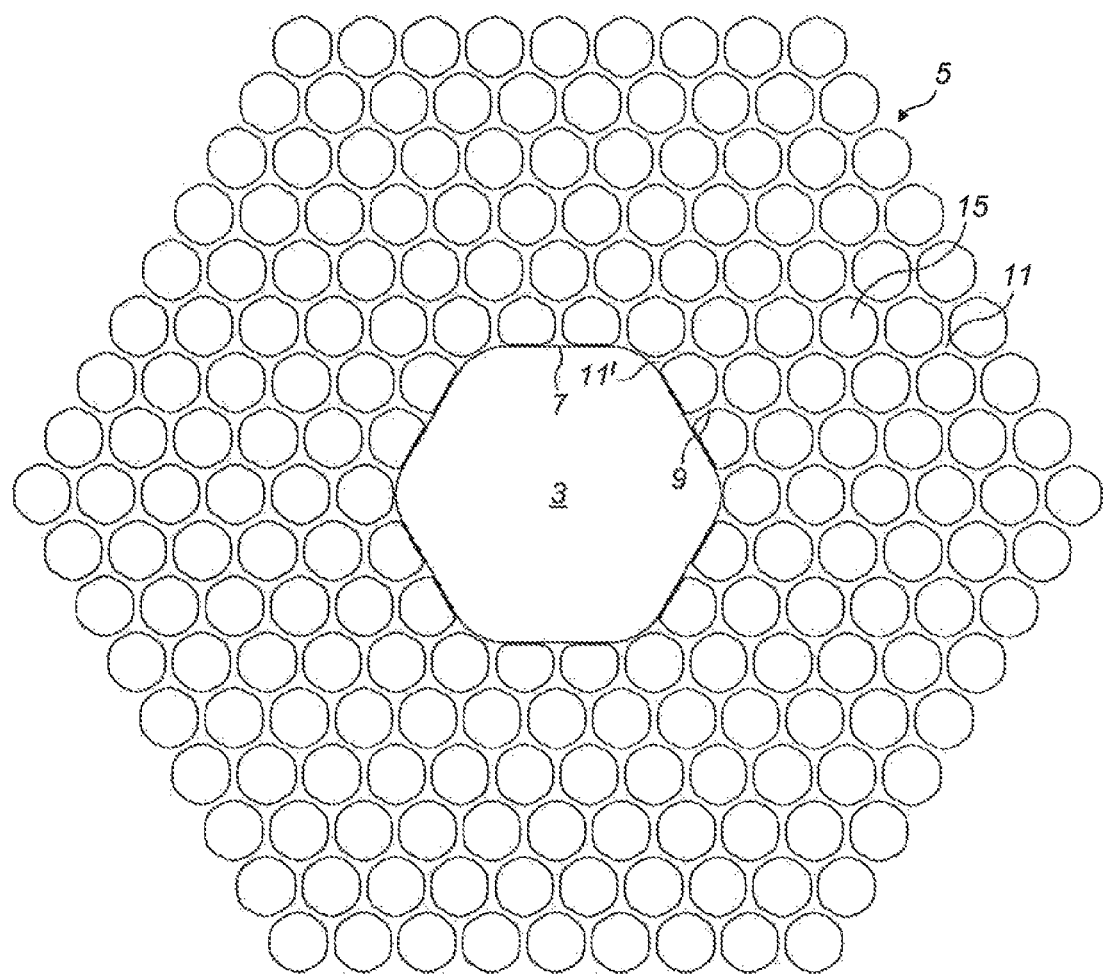
FIG. 1 illustrates a lateral cross-section through an "ideal" HC-PBGF in accordance with the prior art.
Figure 4:
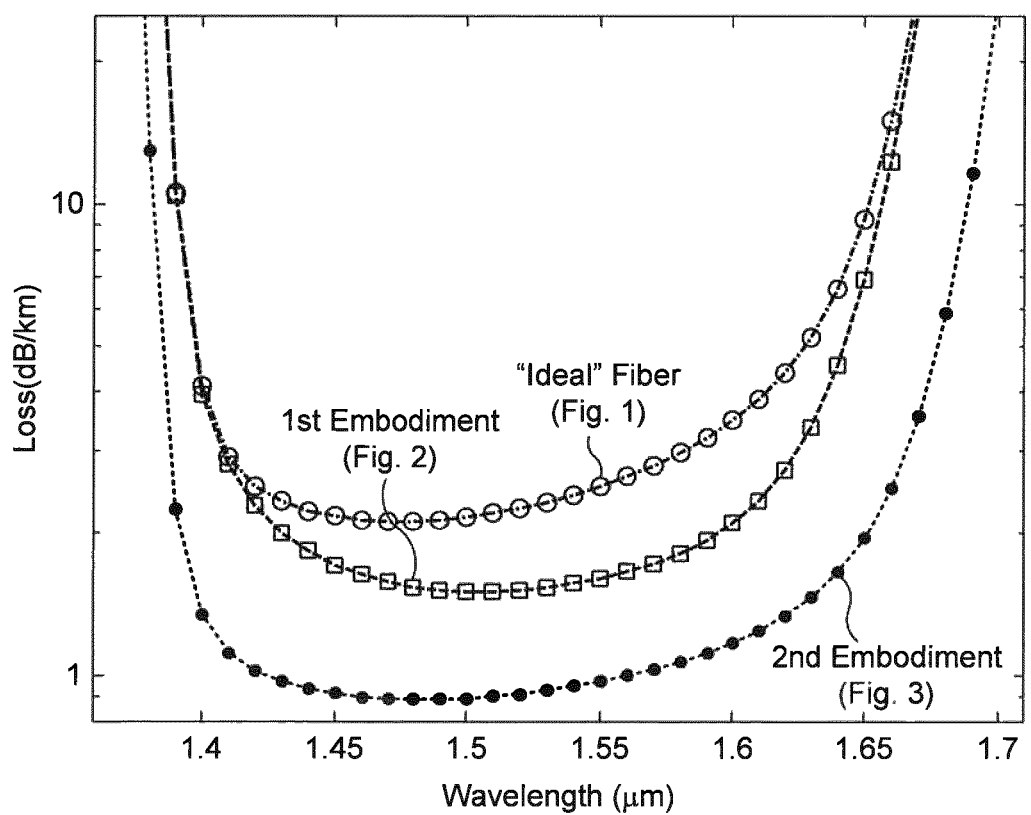
FIG. 4 illustrates plots of the simulated losses for the "ideal" fiber of FIG. 1, the fiber of FIG. 2 and the fiber of FIG. 3.

The present inventors have established that surprisingly, and contrary to the understanding in the art which requires an exact periodicity of the structure of the cladding 103, as illustrated in the "ideal" fiber of FIG. 1, by arranging the core struts 109' to have substantially equal length and the core nodes 111' to be substantially equi-spaced, there is a significant reduction in fiber loss over a much broader operational bandwidth. As illustrated in FIG. 4, the loss value is about 40% lower than the loss seen in the "ideal" fiber of FIG. 1.

The present inventors postulate that the broader operational bandwidth is provided by improved uniformity of the core struts 109' in terms of length and mass, arising from equi-spacing of the core nodes 111', and that the reduction in fiber loss arises as a result of the field being equally prevented from overlapping each of the core struts 109'.

In one embodiment the core nodes 111' have substantially the same size as the nodes 111 within the body of the cladding 105 which arrangement yields the lowest fiber loss.

In this embodiment the core struts 109' have an average thickness ($t_c$) of about 23 nm, the cladding struts 109 have an average thickness ($t_c$) of 47 nm, the average cladding node area is 0.47 μm$^2$ and the overall effective fiber diameter ($D_{cladding}$) is 80 μm, which are the same as for the "ideal" fiber of FIG. 1.

In this embodiment the fiber is a nineteen cell (19c) fiber, having an effective core diameter of 5Λ, where Λ is the average spacing of the cavities 115, which is the same size as the "ideal" fiber of FIG. 1.

In an alternative embodiment the fiber could have a different core size, for example, a thirty-seven cell (37c) fiber, having an effective core diameter of 7Λ, or a sixty-one cell (61c) having an effective core diameter of 9Λ.

FIG. 3 illustrates a fiber in accordance with a second embodiment of the present invention.

The fiber of this embodiment is quite similar to the fiber of the first-described embodiment, and thus, in order to avoid unnecessary duplication of description, only the differences will be described in detail, with like parts being designated by like reference signs.

In this embodiment the fiber has an enlarged core 103 as compared both to the "ideal" fiber of FIG. 1 and the fiber of the first-described embodiment.

In this embodiment the core 103 has an effective diameter of 1.26 times greater than that of the "ideal" fiber of FIG. 1, where the effective diameter is nΛ, here 5Λ, and where Λ is 4.4 μm.

In one embodiment the average cavity spacing Λ is from about 3 μm to about 6 μm in fibers operating at a wavelength of 1.55 μm.

In another embodiment the average cavity spacing Λ is from about 4 μm to about 8 μm in fibers operating at the minimum loss wavelength of 2 μm.

As illustrated in FIG. 4, the reduction in fiber loss, as compared to the "ideal" fiber of FIG. 1, is further reduced in relation to the first-described embodiment, here by a factor as high as 2.4 over the entire transmission bandwidth.

Figure 5:
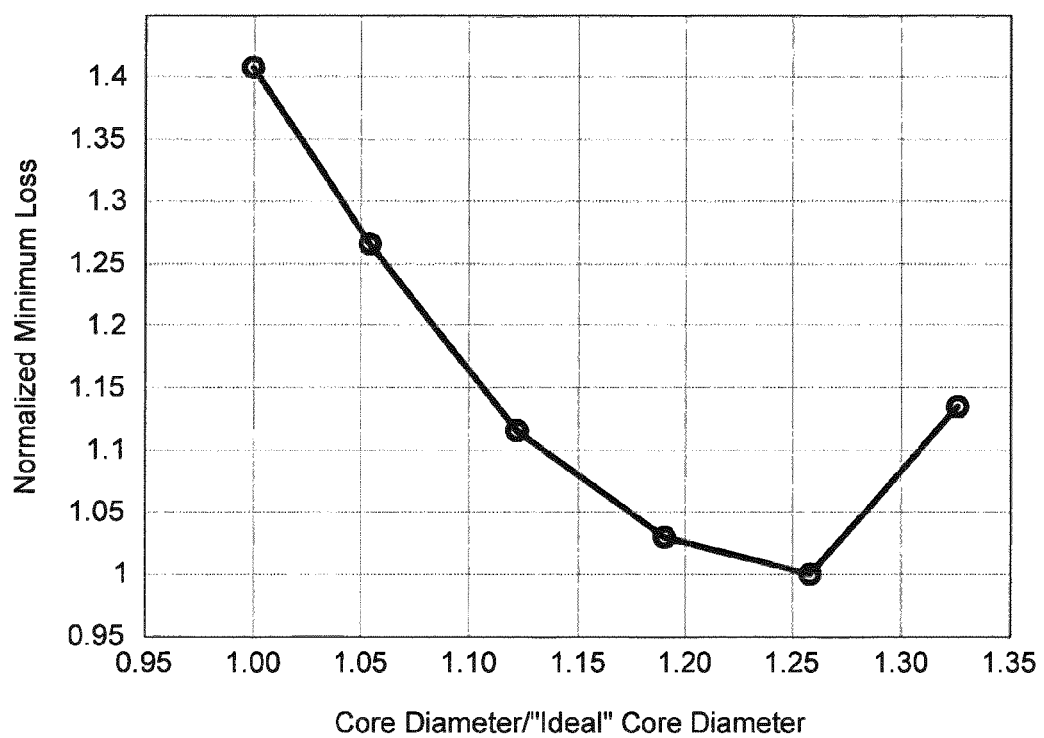
FIG. 5 illustrates a plot of the simulated loss as a function of core diameter for the fiber of FIG. 3.

FIG. 5 illustrates a plot of the simulated loss as a function of core diameter for the fiber of FIG. 3. As will be seen, the fiber of this embodiment has an optimum more diameter ratio of from about 1.05 to about 1.35 nΛ, preferably from about 1.05 nΛ, still preferably from about 1.1 to about 1.35 nΛ, and more preferably from about 1.15 to about 1.30 nΛ.

Figure 6:
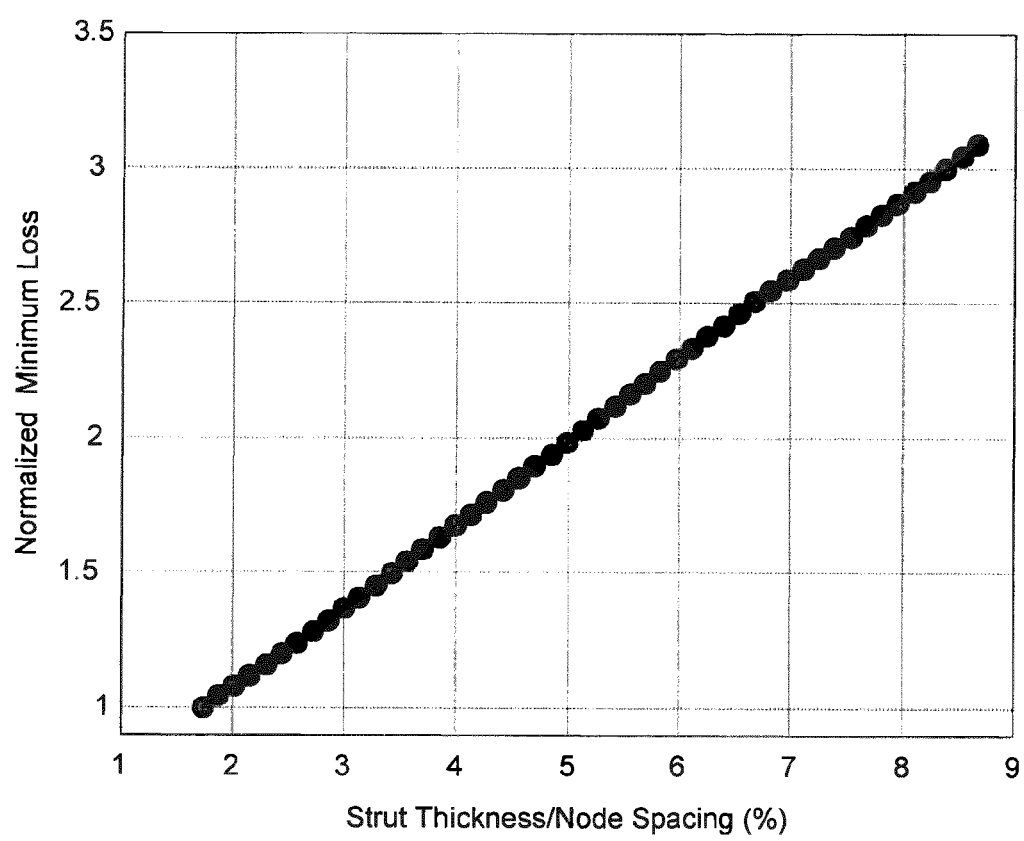
FIG. 6 illustrates a plot of the simulated loss of the fiber of FIG. 3 as a function of a ratio of the thickness ($t_c$) of the struts to the average spacing of the nodes.

In addition, as illustrated in FIG. 6, which illustrates the simulated loss for the fiber of FIG. 3 as a function of a ratio of the average thickness ($t_c$) of the struts 109 to the average spacing of the nodes 111, the present invention allows for reduction of loss by optimizing the thickness ($t_c$) of the struts 109 in relation to the spacing of the nodes 111. In the present invention, loss is minimized by providing that the ratio of the average thickness ($t_c$) of the struts 109 to the average spacing of the nodes 111 is less than about 5%, and optionally less than about 2%.

Figure 7:
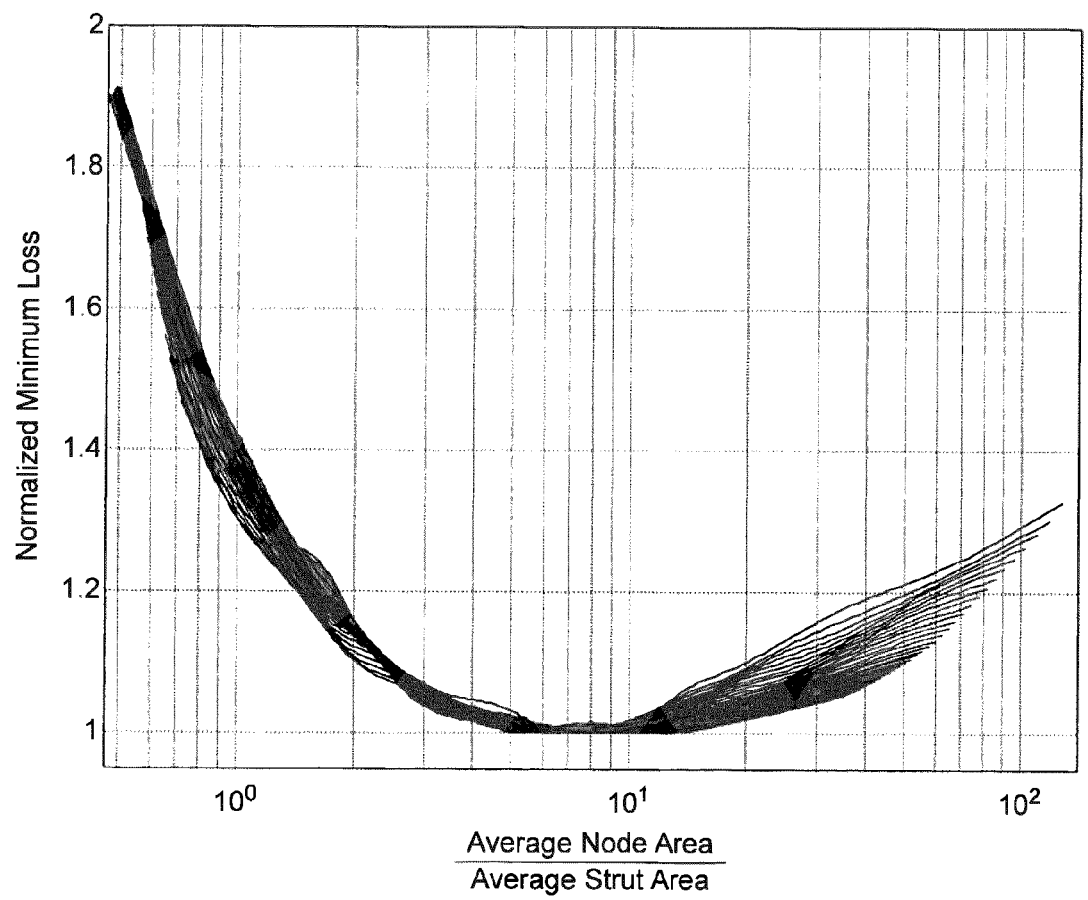
FIG. 7 illustrates plots of the simulated loss of the fiber of FIG. 3 as a function of a ratio of the area of the struts to the area of the nodes.

Furthermore, as illustrated in FIG. 7, which illustrates plots of the simulated loss for the fiber of FIG. 3 as a function of a ratio of the average area of the struts 109 to the average area of the nodes 111, the present invention allows for reduction of loss by optimizing the area of the struts 109 in relation to the area of the nodes 111; the various plots being for fibers having a ratio of the average thickness ($t_c$)

of the struts 109 to the average spacing of the nodes 111 in the range of from 1.7% to 8.6%.

For the purposes of calculation, the area of each strut 109 is the area over which the strut 109 has a substantially uniform thickness, and the area of each node 111 is the area enclosed between three adjoining struts 109 of substantially uniform thickness.

In the present invention, loss is minimized by providing that the ratio of the average area of the nodes 111 to the average area of the struts 109 is from about 1 to about 30, preferably from about 1 to about 20, still more preferably from about 2 to about 20, yet more preferably from about 4 to about 13, yet still more preferably from about 4 to about 10, and still yet more preferably from about 6 to about 10.

Figure 8:
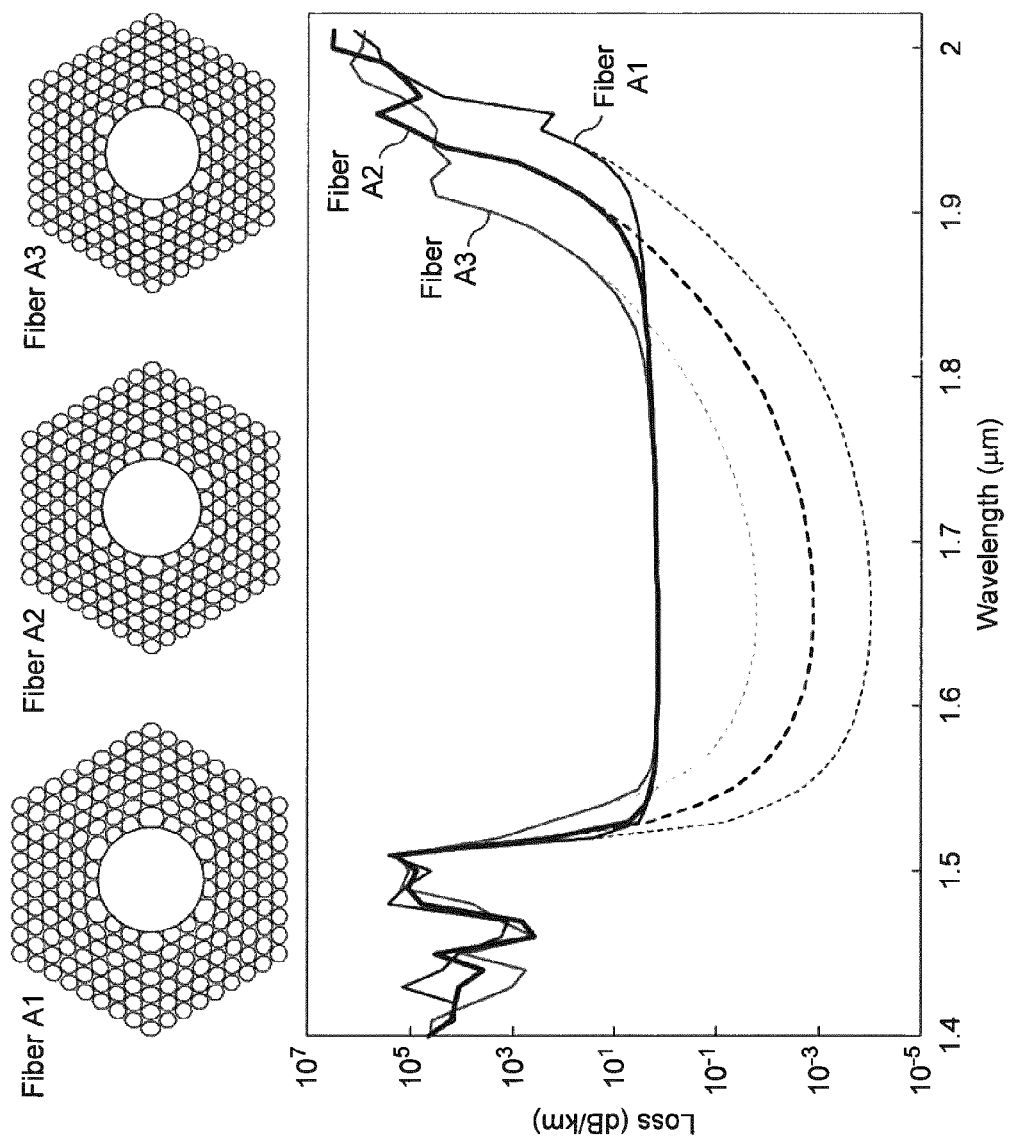
FIG. 8 illustrates plots of the simulated loss as a function of cladding thickness for the fiber of FIG. 3.

FIG. 8 illustrates plots of the simulated loss as a function of wavelength for three exemplary fibers, here in accordance with the fiber of FIG. 2, each having the same effective core diameter and the same effective diameter for the first two rings of cavities 115, but with a decreasing thickness to the remaining, outer rings of cavities 115. In this embodiment the decreased thickness of the outer rings of cavities 115 is achieved by radial compression.

In the first fiber (Fiber A1), the core 115 has an effective core radius ($R_{core}$) of 13 μm, the ratio of the effective core diameter ($D_{core}$) to the effective cladding diameter ($D_{cladding}$) is 0.31, whereby the thickness of the microstructured cladding in the radial direction is 28.93 μm, the average strut thickness ($t_c$) is 110 nm, the fillet radius ($r_c/W$) is 0.21, where W is the average diameter of the cavities 115, and the photonic bandgap is centered around a wavelength of 1.7 μm.

In the second fiber (Fiber A2), the core 115 has an effective core radius ($R_{core}$) of 13 μm, the thickness of the microstructured cladding in the radial direction is 26.84 μm (95% of that of Fiber A1), the average strut thickness ($t_c$) is 110 nm, the fillet radius ($r_c/W$) is 0.21, and the photonic bandgap is centered around a wavelength of 1.65 μm.

In the third fiber (Fiber A3), the core 115 has an effective core radius ($R_c$) of 13 μm, the thickness of the microstructured cladding in the radial direction is 24.74 μm (90% of that of Fiber A1), the average strut thickness ($t_c$) is 110 nm, the fillet radius ($r_c/W$) is 0.21, and the photonic bandgap is centered around a wavelength of 1.625 μm.

As can be seen from FIG. 8, confinement loss, plotted in dotted lines, increases by more than an order of magnitude for each progressive cladding compression, and contributes to a net reduction in the overall transmission bandwidth. The narrower bandwidth results from more closely spaced nodes (narrowing the photonic bandgap) and a thinner air cavity region surrounding the core (increasing the confinement loss). However, at wavelengths well within the bandgap, all fibers have essentially the same value of total loss, which confirms that loss is dominated by scattering from surface roughness, which is mostly unaffected by the structure beyond the second ring of cavities 115. As a result, the HC-PBGF of the present invention advantageously is robust to slight distortions beyond the second ring of air holes 115.

Figure 9:
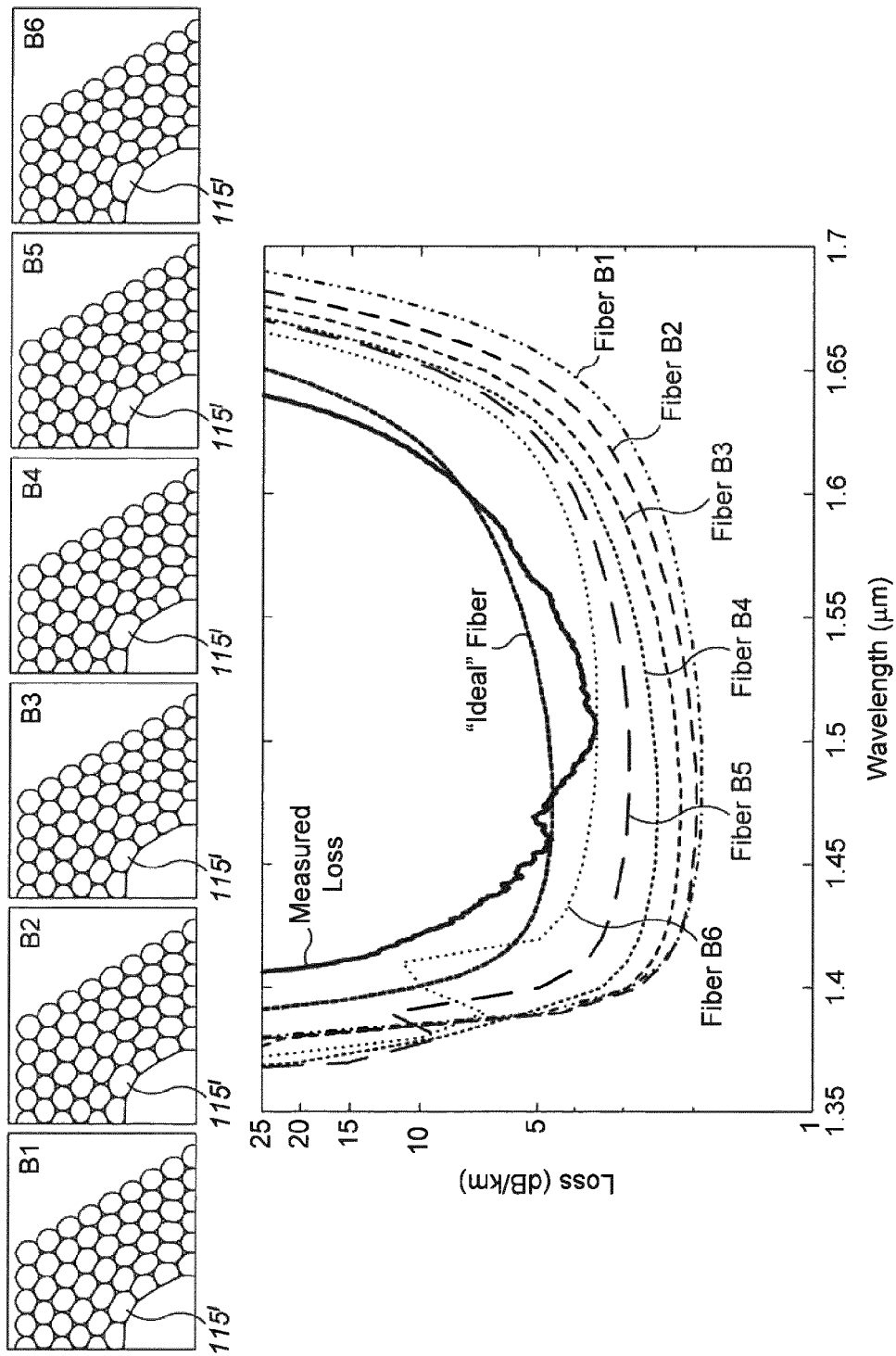
FIG. 9 illustrates plots of the simulated loss as a function of the size of the "corner" cavities for the fiber of FIG. 3 and the "ideal" fiber of FIG. 1.

FIG. 9 illustrates plots of simulated loss as a function of the size of the oversized "corner" cavities 115' at the core boundary 107 for six fibers (Fibers B1 to B6) in accordance with the embodiment of FIG. 3. Also superposed is the loss plot for the "ideal" fiber of FIG. 1, and the cutback measurement for the fabricated "ideal" fiber [1].

These oversized "corner" cavities arise as a natural consequence of surface tension trying to create a circular core surround from an original hexagonal structure, and in an alternative embodiment could be undersized.

In this embodiment the fiber has an effective core diameter ($D_{core}$) of 26 μm, the ratio of the core diameter ($D_{core}=2R_c$) to the cladding diameter ($D_{cladding}$) is 0.36 (which compares to 0.31 for the embodiment of FIG. 2), the average thickness ($t_c$) of the cladding struts 111 is 110 nm, the average thickness ($t_c$) of the core struts 111', which define the core boundary 107, is 55 nm and the fillet radius ($r_c/W$) is 0.21.

In this embodiment the length uniformity (Q) of the pitches of the adjacent core nodes 109' for each of the Fibers B1 to B6, which is given by a ratio between the length difference between the longest and shortest pitches (ΔI) and the average length of the pitches of the core nodes 109' (mean(I)), is 0.01, 0.15, 0.29, 0.45, 0.57 and 0.74, which compares to a length uniformity (Q) of 0.536 for the "ideal" fiber of FIG. 1.

In addition, conservation of the glass volume in the struts 109, 109' was imposed, resulting in struts 111, 111' longer than average being thinner than and vice-versa for shorter struts 109, 109'.

In Fibers B1 to B6, the size of the corner holes was increased in incremental steps from $2.8R_c/(5\sqrt{3})$ to $4.8R_c/(5\sqrt{3})$, and the mode profiles and loss computed for all wavelengths across the bandgap.

As before, the scattering loss contribution remains dominant for the six ring structures. Although the leakage loss contribution in the fiber with the most enlarged "corner" holes 115' (Fiber B6) is twice as much as for the fiber with the least enlarged "corner" holes 115' (Fiber B1), this still only amounts to 0.035 dB/km, which is a small fraction of the total loss.

As can be seen from FIG. 9, fibers with larger corner holes 115' suffer from higher losses. The larger corner holes 115' impose larger gaps between the nodes 111' on the core boundary 107, and such gaps prompt the electric field to overlap more strongly with the scattering surfaces, generating a significantly higher scattering loss, as illustrated in the contour plots of FIGS. 10(a) and (b), which illustrate the contour lines for the time average power flow in the z-direction over a 30 dB range at 2 dB intervals for Fibers B1 and B6, Fiber B1 not only results in reduced overlap of the guided field with the scattering surfaces, but also avoids introducing surface modes within the photonic bandgap.

It is striking to note that the structure considered to date to be the "ideal" fiber design, as illustrated in FIG. 1, is that which provides the highest loss, despite featuring a core surround that preserves the periodicity of the structure. As discussed above, this is due to a smaller core diameter ($D_{core}$), but also because the pitch of the nodes 111' on the core boundary 107 is not uniform, which in combination leads to the loss in this "ideal" fiber being 2.4 times higher than that of Fiber B1, in which the nodes 111' on the core boundary are equidistant.

FIG. 11 illustrates plots of loss as a function or core wall thickness for fibers (Fibers C1 to C3) in accordance with the embodiment of FIG. 3, where each having equi-spaced core nodes 111' and having no core tube and core tubes of the same thickness as the capillaries in the starting stack and 1.25 times the thickness of the capillaries in the starting stack.

As will be seen, when mass conservation is applied to the wall at the core boundary 107 in the absence of core tube in the preform (Fiber C1), the fundamental mode bandwidth is wide and loss remains low. Additionally, the effective indices of all the guided modes are clearly separated.

When the core wall thickness is increased by, for example, introducing a core tube as thick as the cladding capillaries (Fiber C2), there is only a small bandwidth or loss penalty for fundamental mode transmission, with the minimum loss increasing from 2 to 2.4 dB/km, with a 10 nm reduction in the bandwidth.

In this embodiment the surface modes introduced cross the fundamental mode near the short wavelength edge of the photonic bandgap, ensuring that the bandwidth for the fundamental mode remains largely unaffected. Higher order modes, however, interact with these surface modes near the center of the bandgap and therefore suffer a severe reduction in bandwidth. This also confirms that the design with equal node spacing on the core boundary 107 not only provides the lowest loss but is also more tolerant to thicker in core wall.

Further increasing the core wall thickness (Fiber C3) has limiting effects on performance. As can be seen, when a core tube which is 1.25 times thicker than the capillaries is used, surface modes anti-cross with the fundamental mode near the middle of the bandgap, resulting in higher losses and severe reduction in bandwidth.

FIG. 12 illustrates plots of loss as a function or core wall thickness for fibers (Fibers D1 to D3) in accordance with the embodiment of FIG. 3, where each having oversized "corner" cavities 115' and having no core tube and core tubes of the same thickness as the capillaries in the starting stack and 1.25 times the thickness of the capillaries in the starting stack, following fibers C1 to C3.

As will be seen, the reduction in bandwidth and increase in loss is clearly more noticeable for fibers with oversized "corner" holes 115', increasing from a minimum of 2.9 dB/km over a bandwidth of 230 nm (Fiber D1) to 4.6 dB/km over a bandwidth of 160 nm (Fiber D2).

Similarly to Fiber C3, further increasing the core wall thickness (Fiber D3) has significant limiting effects on performance.

FIG. 13(a) illustrates plots of dispersion for fibers in accordance with the embodiment of FIG. 3, with the nodes 111' at the core boundary 107 having a size of approximately 0.6 (Fiber E1), 1 (Fiber E2) and 1.4 (Fiber E3) times the average size of the nodes 111 within the body of the cladding 105.

In this embodiment the pitch of the cavities 115 ($\Lambda$) is 3.03 µm, d/$\Lambda$ is 0.987 and $D_c$/W is 0.6, where W is the average effective internal diameter of the cavities 115.

As can be seen, the fiber of the present invention allows readily for engineered dispersion through adjustment of the size of the core nodes 111' at the core boundary 107.

FIG. 13(b) illustrates plots of loss as a function of node size, corresponding to FIG. 13(a).

As regards application, the HC-PBGF of the present invention has diverse application, including optical fiber communication systems, in particular ultrahigh capacity, ultralong haul systems and low latency short haul systems (such as of interest to financial trading firms/banks), datacomms, in particular low latency fiber links in datacentres and supercomputers, large scale high-energy physics (HEP), in particular use for low latency data transfer in detector arrays and for timing synchronisation, high-power laser delivery, in particular continuous-wave and pulsed radiation formats at diverse wavelengths, and gas sensing, in particular compact gas cells for environmental sensing/laser stabilisation.

Finally, it will be understood that the present invention has been described in its preferred embodiments and can be modified in many different ways without departing from the scope of the invention as defined by the appended claims.

REFERENCES

1. F. Poletti, N. V. Wheeler, M. N. Petrovich, N. Baddela, E. Numkam Fokoua, J. R. Hayes, D. R. Gray, Z. Li, R. Slavik, and D. J. Richardson, "Towards high-capacity fibre-optic communications at the speed of light in vacuum," Nature Photonics 7, 279-284 (2013).
2. Y. Jung, V. A. J. M. Sleiffer, N. Baddela, M. N. Petrovich, J. R. Hayes, N. V. Wheeler, D. R. Gray, E. Numkam Fokoua, J. P. Wooler, H. H.-L. Wong, F. Parmigiani, S.-U. Alam, J. Surof, M. Kuschnerov, V. Veljanovski, H. de Waardt, F. Poletti, and D. J. Richardson, "First demonstration of a broadband 37-cell hollow core photonic bandgap fiber and its application to high capacity mode division multiplexing," in *Proceedings of the Optical Fiber Communications conference* (2013), paper PDP5A.3 (Postdeadline).
3. P. J. Roberts, F. Couny, H. Sabert, B. J. Mangan, D. P. Williams, L. Farr, M. W. Mason, A. Tomlinson, T. A. Birks, J. C. Knight, and P. S. J. Russell, "Ultimate low loss of hollow-core photonic crystal fibres," Opt. Express 13, 236-244 (2005).
4. E. Numkam Fokoua, F. Poletti, and D. J. Richardson, "Analysis of light scattering from surface roughness in hollow-core photonic bandgap fibers," Opt. Express 20, 20980-20991 (2012).
5. B. J. Mangan, L. Farr, A. Langford, P. J. Roberts, D. P. Williams, F. Couny, M. Lawman, M. Mason, S. Coupland, R. Flea, H. Sabert, T. A. Birks, J. C. Knight, and P. St. J. Russell, "Low loss (1.7 dB/km) hollow core photonic bandgap fiber," in *Proceedings of Optical Fiber Communication Conference* (2004), paper PDP24.
6. P. Roberts, D. Williams, B. Mangan, H. Sabert, F. Couny, W. Wadsworth, T. Birks, J. Knight, and P. Russell, "Realizing low loss air core photonic crystal fibers by exploiting an antiresonant core surround," Opt. Express 13, 8277-8285 (2005).
7. C. M. Smith, N. Venkataraman, M. T. Gallagher, D. Muller, J. A. West, N. F. Borrelli, D. C. Allan, and K. W. Koch, "Low-loss hollow-core silica/air photonic bandgap fibre," Nature 424, 657-659, (2003).
8. R. Amezcua-Correa, N. G. Broderick, M. N. Petrovich, F. Poletti, and D. J. Richardson, "Optimizing the usable bandwidth and loss through core design in realistic hollow-core photonic bandgap fibers," Opt. Express 14, 7974-7985 (2006).
9. R. Amezcua-Correa, N. G. R. Broderick, M. N. Petrovich, F. Poletti, and D. J. Richardson, "Design of 7 and 19 cells core air-guiding photonic crystal fibers for low-loss, wide bandwidth and dispersion controlled operation," Opt. Express 15, 17577-17586 (2007).
10. R. Amezcua-Correa, F. Gènôme, S. G. Leon-Saval, N. G. R. Broderick, T. A. Birks, and J. C. Knight, "Control of surface modes in low loss hollow-core photonic bandgap fibers," Opt. Express 16, 1142-1149 (2008).
11. M. H. Frosz, J. Nold, T. Weiss, A. Stefani, F. Babic, S. Rammler, and P. St. J. Russell, "Five-ring hollow-core photonic crystal fiber with 1.8 dB/km loss," Opt. Lett. 38, 2215-2217 (2013).
12. Kunimasa Saitoh and Masanori Koshiba, "Leakage loss and group velocity dispersion in air-core photonic bandgap fibers," Opt. Express 11, 3100-3109 (2003).
13. Ming-Jun Li, James A. West, and Karl W. Koch, "Modeling Effects of Structural Distortions on Air-Core Photonic Bandgap Fibers," J. Lightwave Technol. 25, 2463-2468 (2007).

14. F. Poletti, M. N. Petrovich, R. Amezcua-Correa, N. G. Broderick, T. M. Monro, and D. J. Richardson, "Advances and Limitations in the Modeling of Fabricated Photonic Bandgap Fibers," in *Optical Fiber Communication Conference and Exposition and The National Fiber Optic Engineers Conference*, Technical Digest (CD) (Optical Society of America, 2006), paper OFC2.

15. Kiarash Zamani Aghaie, Michel J. F. Digonnet, and Shanhui Fan, "Experimental Assessment of the Accuracy of an Advanced Photonic-Bandgap-Fiber Model," J. Lightwave Technol. 31, 1015-1022 (2013).

16. Francesco Poletti, "Hollow core fiber with an octave spanning bandgap," Opt. Lett. 35, 2837-2839 (2010).

17. F. Poletti, and E. Numkam Fokoua "Understanding the Physical Origin of Surface Modes and Practical Rules for their Suppression," accepted for oral presentation at ECOC 2013.

18. Tadashi Murao, Kunimasa Saitoh, and Masanori Koshiba, "Structural Optimization of Air-Guiding Photonic Bandgap Fibers for Realizing Ultimate Low Loss Waveguides," J. Lightwave Technol. 26, 1602-1612 (2008)

The invention claimed is:

1. A hollow-core photonic bandgap fiber having a hollow core and a cladding which surrounds the core at a core boundary and comprises a lattice or network of struts and interstitial nodes which together define an array of cavities, wherein the nodes at the core boundary have different pitch spacings and a a ratio between a difference in a length of a longest and shortest pitch spacing of the nodes at the core boundary to an average pitch spacing at the core boundary is less than about 0.3.

2. The fiber of claim 1, wherein a ratio between a difference in a length of a longest and shortest pitch spacing of the nodes at the core boundary to an average pitch spacing at the core boundary is (i) less than about 0.25, (ii) less than about 0.2, (iii) less than about 0.1, (iv) less than about 0.05, (v) less than about 0.02, or (vi) less than about 0.01.

3. The fiber of claim 1, wherein the core is gas filled, wherein the gas is one of air, argon, xeon, helium or hydrogen, or the core is a vacuum.

4. The fiber of claim 1, wherein the core is substantially circular in section.

5. The fiber of claim 1, wherein the network is formed of glass.

6. The fiber of claim 1, wherein the cavities comprise gas-filled holes, wherein the gas is one of air, argon, xeon, helium or hydrogen, or the cavities comprise a vacuum.

7. The fiber of claim 1, wherein the cavities are arranged in triangular-packed relation, square-packed relation or hexagonal-packed relation.

8. The fiber of claim 1, wherein a ratio of the average cross-sectional area of the nodes at the core boundary to the average cross-sectional area of the nodes within a body of the cladding is (i) from about 0.8 to about 1.2, (ii) from about 0.9 to about 1.1, (iii) from about 0.95 to about 1.05, or (iv) the nodes at the core boundary and the nodes within a body of the cladding are substantially equi-sized.

9. The fiber of claim 1, wherein a ratio of the average cross-sectional area of the nodes at the core boundary to the average cross-sectional area of the nodes within a body of the cladding is from about 1.4 to about 2.0.

10. The fiber of claim 1, wherein the struts at the core boundary have substantially equal thickness.

11. The fiber of claim 1, wherein a ratio of a thickness of the struts at the core boundary to a thickness of the struts within a body of the cladding is (i) from about 0.4 to about 3.5, (ii) from about 0.4 to about 1.0, (iii) from about 0.6 to about 1.0, (iv) from about 0.7 to about 1.0, or (v) from about 0.8 to about 1.0.

12. The fiber of claim 1, wherein an average spacing of the cavities has a variance outside of the range of from 0.98 to 1.02.

13. The fiber of claim 1, wherein the fiber has a three cell (3c) core defect, a seven cell (7c) core defect, a nineteen cell (19c) core defect, a thirty-seven cell (37c) core defect or a sixty-one cell (61c) core defect.

14. The fiber of claim 1, wherein the effective diameter of the core is (i) greater than about 1.05 nΛ, (ii) from about 1.05 nΛ to about 1.35 nΛ, (iii) from about 1.1 nΛ to about 1.35 nΛ, (iv) from about 1.15 nΛ to about 1.30 nΛ, or (v) from about 1.05 nΛ to about 1.25 nΛ, where n is the number of cells removed to form the core along the diagonal and Λ is the average spacing of the cavities.

15. The fiber of claim 1, wherein a ratio of a thickness of the struts to an average spacing of the nodes is (i) less than about 0.05, or (ii) less than about 0.02.

16. The fiber of claim 1, wherein a ratio of a cross-sectional area of the struts to a cross-sectional area of the nodes is (i) from about 1 to about 30, (ii) from about 1 to about 20, (iii) from about 2 to about 20, (iv) from about 4 to about 13, (v) from about 4 to about 10, or (vi) from about 6 to about 10.

17. The fiber of claim 1, wherein a ratio of the effective diameter of the core to the effective diameter of the cladding is (i) at least about 0.33 when five rings of cavities surround the core, (ii) at least about 0.3 when six rings of cavities surround the core, (iii) at least about 0.35 when six rings of cavities surround the core, or (iv) at least about 0.27 when seven rings of cavities surround the core.

18. A hollow-core photonic bandgap fiber having a hollow core and a cladding which surrounds the core at a core boundary and comprises a lattice or network of struts and interstitial nodes which together define an array of cavities, wherein the nodes at the core boundary have different pitch spacings, and:
   (i) a ratio of the average cross-sectional area of the nodes at the core boundary to the average cross-sectional area of the nodes within a body of the cladding is (i) from 0.8 to 1.2, or (ii) from 1.4 to 2.0; or
   (ii) a ratio of a thickness of the struts at the core boundary to a thickness of the struts within a body of the cladding is from 0.4 to 1.0.

19. A hollow-core photonic bandgap fiber having a hollow core and a cladding which surrounds the core at a core boundary and comprises a lattice or network of struts and interstitial nodes which together define an array of cavities, wherein the nodes at the core boundary have different pitch spacings and the effective diameter of the core is greater than 1.05 nΛ, where n is the number of cells removed to form the core along the diagonal and Λ is the average spacing of the cavities.

20. A hollow-core photonic bandgap fiber having a hollow core and a cladding which surrounds the core at a core boundary and comprises a lattice or network of struts and interstitial nodes which together define an array of cavities, wherein the nodes at the core boundary have different pitch spacings, and:
   (i) a ratio of a thickness of the struts to an average spacing of the nodes is less than 0.05;
   (ii) a ratio of a cross-sectional area of the struts to a cross-sectional area of the nodes is from 1 to 30;

(iii) a ratio of the effective diameter of the core to the effective diameter of the cladding is at least 0.33 when five rings of cavities surround the core;
(iv) a ratio of the effective diameter of the core to the effective diameter of the cladding is at least 0.3 when six rings of cavities surround the core; or
(v) a ratio of the effective diameter of the core to the effective diameter of the cladding is at least 0.27 when seven rings of cavities surround the core.

* * * * *